(12) United States Patent
Pantel (10) Patent No.: US 9,276,518 B2
(45) Date of Patent: Mar. 1, 2016

(54) PANEL SUPPORT STRUCTURE

(71) Applicant: Richard Pantel, Round Hill, VA (US)

(72) Inventor: Richard Pantel, Round Hill, VA (US)

( * ) Notice: Subject to any disclaimer, the term of this patent is extended or adjusted under 35 U.S.C. 154(b) by 173 days.

(21) Appl. No.: 14/053,374

(22) Filed: Oct. 14, 2013

(65) Prior Publication Data
US 2015/0102186 A1    Apr. 16, 2015

(51) Int. Cl.
| | |
|---|---|
| F16L 3/00 | (2006.01) |
| H02S 20/10 | (2014.01) |
| F16M 13/02 | (2006.01) |
| F24J 2/52 | (2006.01) |
| H01L 31/042 | (2014.01) |

(52) U.S. Cl.
CPC ............... *H02S 20/10* (2014.12); *F16M 13/02* (2013.01); *F24J 2/5201* (2013.01); *H02S 20/00* (2013.01)

(58) Field of Classification Search
CPC ....... F24J 2/5233; F24J 2/5239; F24J 2/4636; F24J 2002/2592; F24J 2/5235; F24J 2/2526; H02S 20/00; H02S 20/24; Y02E 10/47
See application file for complete search history.

(56) References Cited

U.S. PATENT DOCUMENTS

| | | | |
|---|---|---|---|
| 2,317,428 A | 4/1943 | Anderson | |
| 5,944,011 A | 8/1999 | Breslin | |
| 6,065,255 A | 5/2000 | Stern | |
| 6,093,884 A | 7/2000 | Toyomura | |
| 6,105,317 A | 8/2000 | Tomiuchi | |
| 6,111,189 A | 8/2000 | Garvison | |
| 6,370,828 B1 | 4/2002 | Genschorek | |
| 6,414,237 B1 | 7/2002 | Boer | |
| 6,465,724 B1 | 10/2002 | Garvison | |
| 6,959,517 B2 | 11/2005 | Poddany | |
| 7,012,188 B2 | 3/2006 | Erling | |
| 7,634,875 B2 | 12/2009 | Genschorek | |
| 7,806,377 B2 | 10/2010 | Strizki | |
| 2004/0128923 A1* | 7/2004 | Moulder | F24J 2/464 52/173.1 |
| 2005/0161073 A1 | 7/2005 | Head | |
| 2008/0087275 A1* | 4/2008 | Sade | F24J 2/5235 126/623 |
| 2009/0302183 A1* | 12/2009 | Strizki | 248/309.1 |
| 2010/0320343 A1* | 12/2010 | Beck | 248/226.11 |
| 2011/0154774 A1* | 6/2011 | Rawlings | 52/745.21 |
| 2011/0277400 A1* | 11/2011 | Kosslinger | F24J 2/5235 52/173.1 |
| 2012/0211252 A1* | 8/2012 | Turziano et al. | 174/6 |
| 2012/0275066 A1* | 11/2012 | O'Brien | F24J 2/5237 361/1 |
| 2013/0276867 A1* | 10/2013 | Wildes et al. | 136/246 |

\* cited by examiner

*Primary Examiner* — Brian Mattei (57) ABSTRACT

A plurality of support structures that may be secured to a surface and may support panels, such as solar modules. The support structures may include a first side that forms a channel and a second side that forms a support flange. A first edge of a panel may be placed within the channel and a second opposing edge of the panel may be secured to the support flange.

9 Claims, 7 Drawing Sheets

PANEL SUPPORT STRUCTURE

BACKGROUND OF THE INVENTION

The present invention relates to a panel support structure and, more particularly, to a plurality of panel support structures for supporting solar modules.

A photovoltaic solar array is a set of solar photovoltaic modules electrically connected and mounted on supporting structures. A photovoltaic module, commonly called a "solar panel", is a packaged, connected assembly of solar cells. The solar module can be used as a component of a larger photovoltaic system to generate and supply electricity in commercial and residential applications. Numerous technical problems exist in connection with mounting devices such as solar photovoltaic modules ("panels") on surfaces that are, or may be, exposed to varying force vectors induced or caused by wind, snow, rain, and other elements of weather.

As can be seen, there is a need for an improved panel support structure.

SUMMARY OF THE INVENTION

In one aspect of the present invention, a device for securing a panel comprises: a support structure comprising a first side, a second side, and a base in between the first side and second side, wherein the first side comprises a top end and a bottom end, wherein the bottom end is connected to the base and the top end forms a channel, wherein the channel is substantially facing away from the second side, wherein the second side comprises a top end and a bottom end, wherein the bottom end is connected to the base and the top end forms a support flange.

In another aspect of the present invention, a support device comprises: a first support structure having a first base and a first side, wherein the first side comprises a top end and a bottom end, wherein the bottom end is connected to the base and the top end forms a channel; and a second support structure having a second base and a second side, wherein the second side comprises a top end and a bottom end, wherein the bottom end is connected to the base, and the top end forms a support flange.

In another aspect of the present invention, a first and a second support structure may be used to support a single panel. The support structures may be set at a distance apart. An edge of the panel may be inserted into the open channel of the first support structure and the panel's opposing edge may be placed upon and affixed to the support flange of the second support structure. A spacer may be affixed between the adjoining devices to maintain a proper distance between the first and second support structure, which may prevent the panel edge within the channel from moving out of position. The base portion of the support structures may be loaded with a ballast to prevent movement of the assembled devices from their original installed locations.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a plurality of support structures that may be secured to a surface and may support panels, such as solar modules. The support structures may include a first side that forms a channel and a second side that forms a support flange. A first edge of a panel may be placed within the channel and a second opposing edge of the panel may be secured to the support flange.

The present invention pertains generally to mounting energy-producing panels on surfaces. The new and useful low profile solid object mounting system of the present invention pertains to a system for securely, safely, yet quickly mounting objects, typically solar panels, onto horizontal or nearly horizontal surfaces by way of grasping two opposing edges of the object and providing a tray in which a ballast is placed in sufficient quantities to resist movement from environmental factors, such as wind.

Referring to FIGS. 1 through 13, the present invention may include a support structure 10. The support structure 10 may include a first side 22, a second side 24 and a base 26 in between the first side 22 and second side 24. The first side 22 may include a top end and a bottom end. The bottom end of the first side 22 may be connected to the base 26. The top end of the first side 22 may form a channel 20. The channel 20 may face away from the second side 24. The second side 24 of the present invention may include a top end and a bottom end. The bottom end of the second side 24 may be connected to the base 26. The top end of the second side 24 may form a support flange 16.

The support structure 10 of the present invention may be made of folded material to form a flat base 26, and a protruding first side 22 and second side 24. The support structure 10 may further include stiffeners to provide resistance to bending. In certain embodiments, the support flange 16 may be a flat bend or in certain embodiments may include a second channel. The support flange 16 of the second side 24 may be protruding towards the first side 22. The first side, 22, second side 24, base 26, support flange 16 and/or the channel 20 may have apertures for mounting and attachments.

The sides 22, 24 may be vertical relative to the base 26, or set at an angle. In certain embodiments, the first side 22 may be shorter than the second side 24. However, the sides 22, 24 may be the same height or the second side 24 may be shorter than the first side 22. The height of the sides 22, 24 may be set so that the panels 12 may be suspended at a desired angle. The top ends of the sides 22, 24 may also be adjusted to suspend the panel 12 at a desired angle.

In certain embodiments, the present invention may include a plurality of support structures 10, such as a first support structure 10 and a second support structure 10. The first and second support structures 10 may be mounted to a surface so that the channel 20 of the first support structure 10 is facing the support flange 16 of the second support structure 10. The first and second support structures 10 may be spaced apart by a row spacer 14 and/or a supplemental ballast pan 28. The row spacer 14 may include a first end and a second end. The first end may be mounted to the channel 20 of the first support structure 10 and the second end may be mounted to the support flange 16 of the second support structure 10. Therefore, an appropriate amount of space is between the first and second support structures 10.

Figure 10:
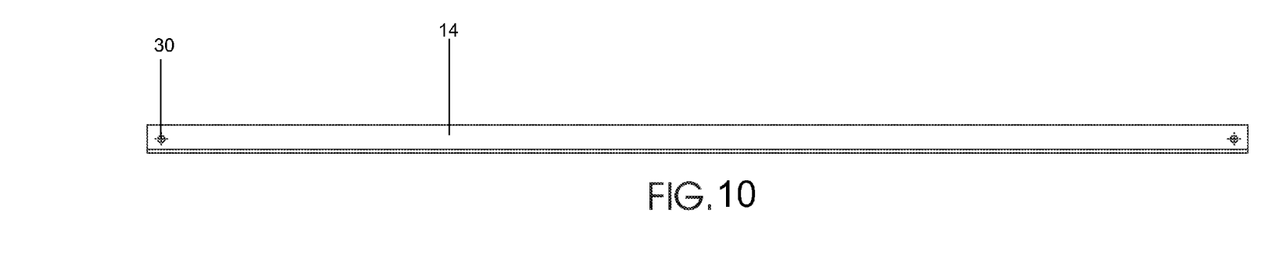
FIG. 10 is a top view of the row spacer of FIG. 8.
Figure 11:
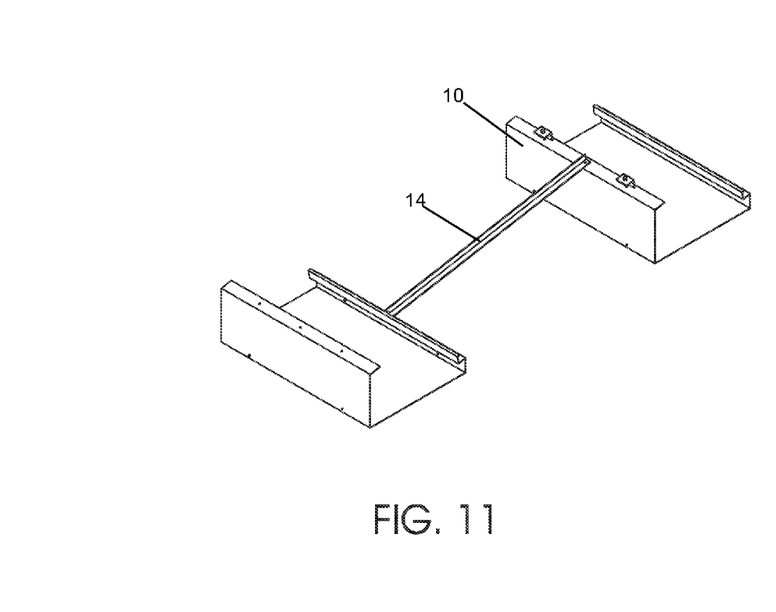
FIG. 11 is a perspective view of the present invention joined together by a row spacer.
Figure 12:
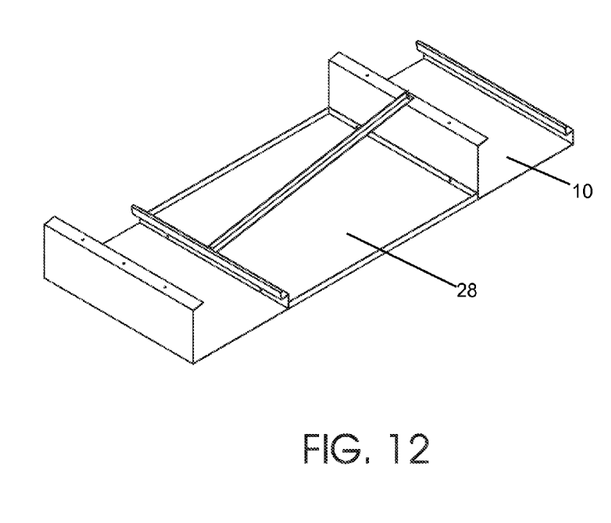
FIG. 12 is a perspective view of FIG. 11 with supplemental ballast pan in between the support structures.
Figure 13:
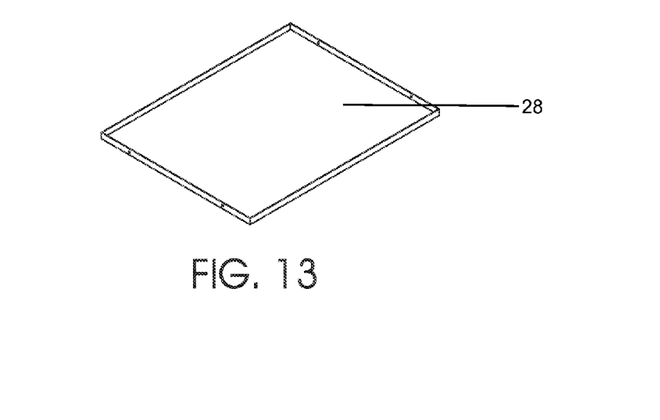
FIG. 13 is a perspective view of the supplemental ballast pan.

The present invention may support panels 12. The panels 12 of the present invention may be a low profile solid rectangular object, such as solar photovoltaic modules. However, the panel 12 is not limited to a solar photovoltaic module and may be any flat rigid structure with edges. The panel 12 may include a first edge and an opposing second edge. The first edge may be placed within the channel 20 and the second edge may be fastened to the support flange 16. In certain embodiments, a clamp 18 may be used to secure the second edge to the support flange 16. As illustrated in FIG. 10, the clamp 18 may be formed at a right angle and may be used to secure the panels 12 to the support structures 10.

The fasteners used for the mounting of the panels 12, the row spacers 14, ballast pans 28, and clamps 18 may be any fastener known in the art. For example, the panels 12, row spacers 14, clamps 18, ballast pans 28, and support structures 10 may include apertures 30. Bolts 32 or screws may be driven through the apertures and thereby securing the above mentioned components together. Another example may include threaded studs or captive nuts, which may be installed through the apertures 30.

Figure 1:
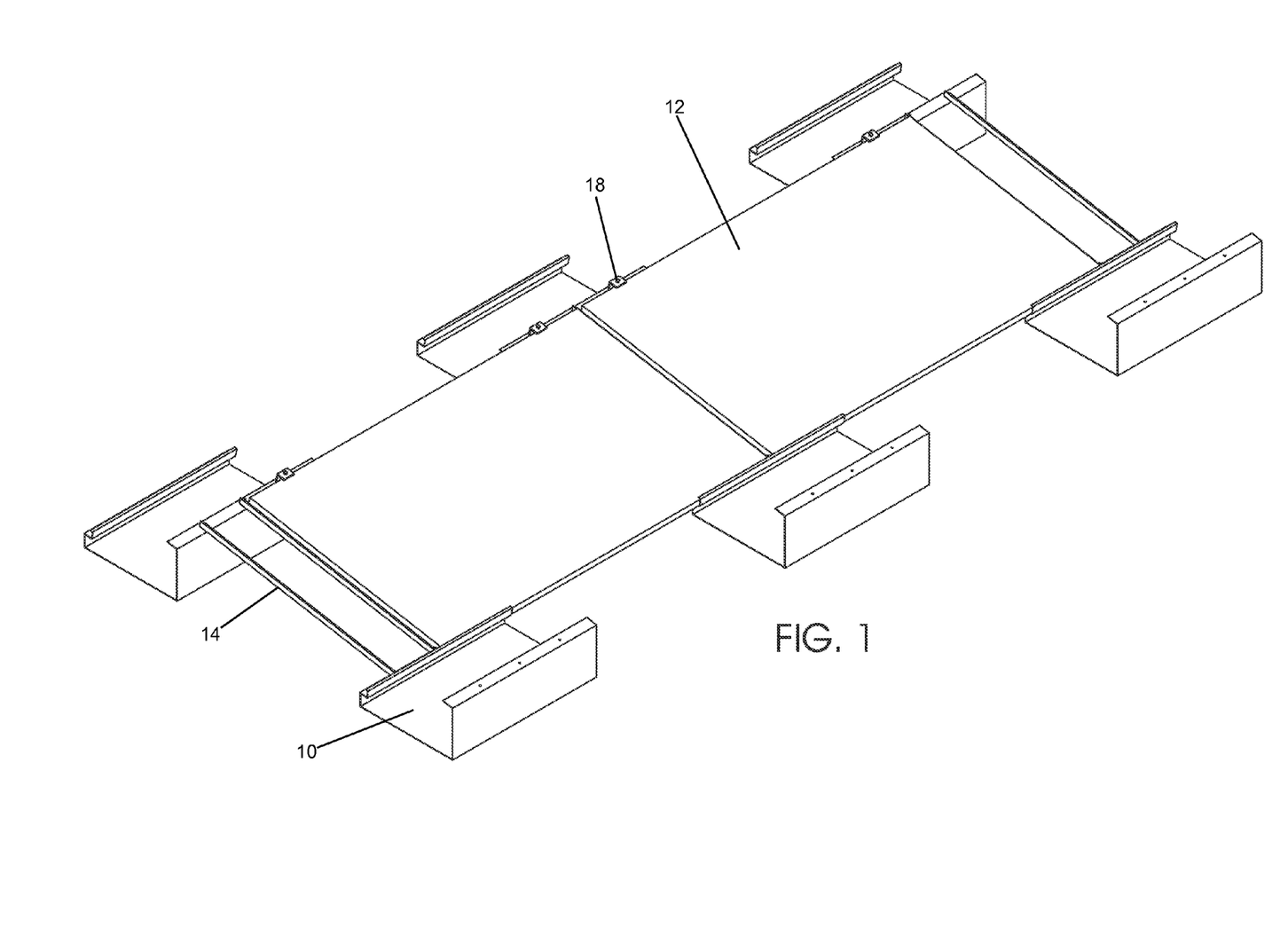
FIG. 1 is a perspective view of the present invention supporting exemplary panels.
Figure 2:
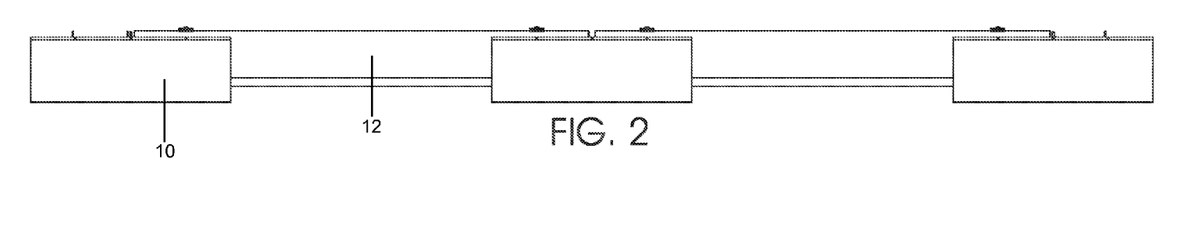
FIG. 2 is a front view of the embodiment of FIG. 1.
Figure 3:
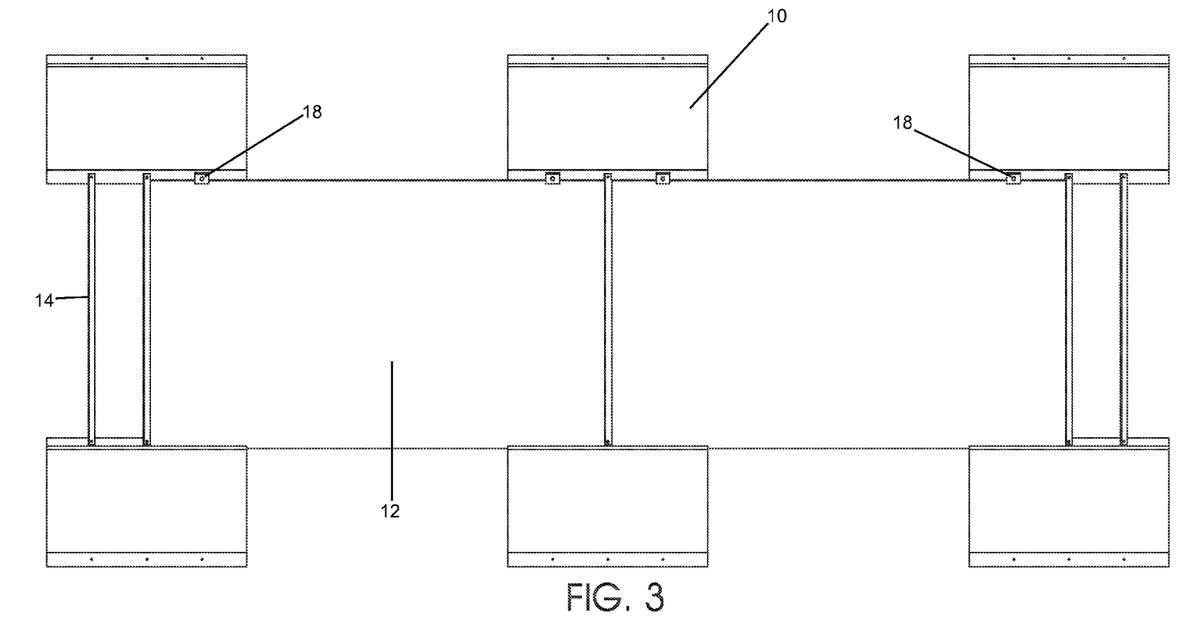
FIG. 3 is a top view of the embodiment of FIG. 1.
Figure 4A:
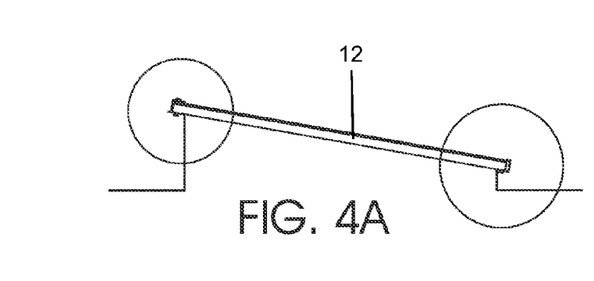
FIG. 4A is a side view of an alternative embodiment of the present invention.
Figures 4B, 4C:
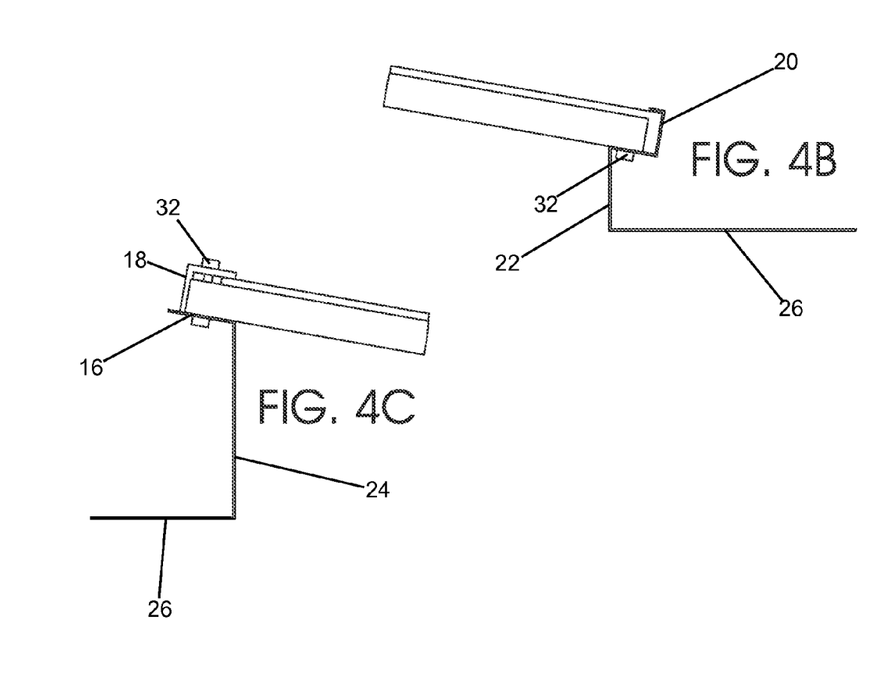
FIG. 4B is a detail view of the channel of the present invention.
FIG. 4C is a detail view of the support flange of the present invention.
Figure 5:
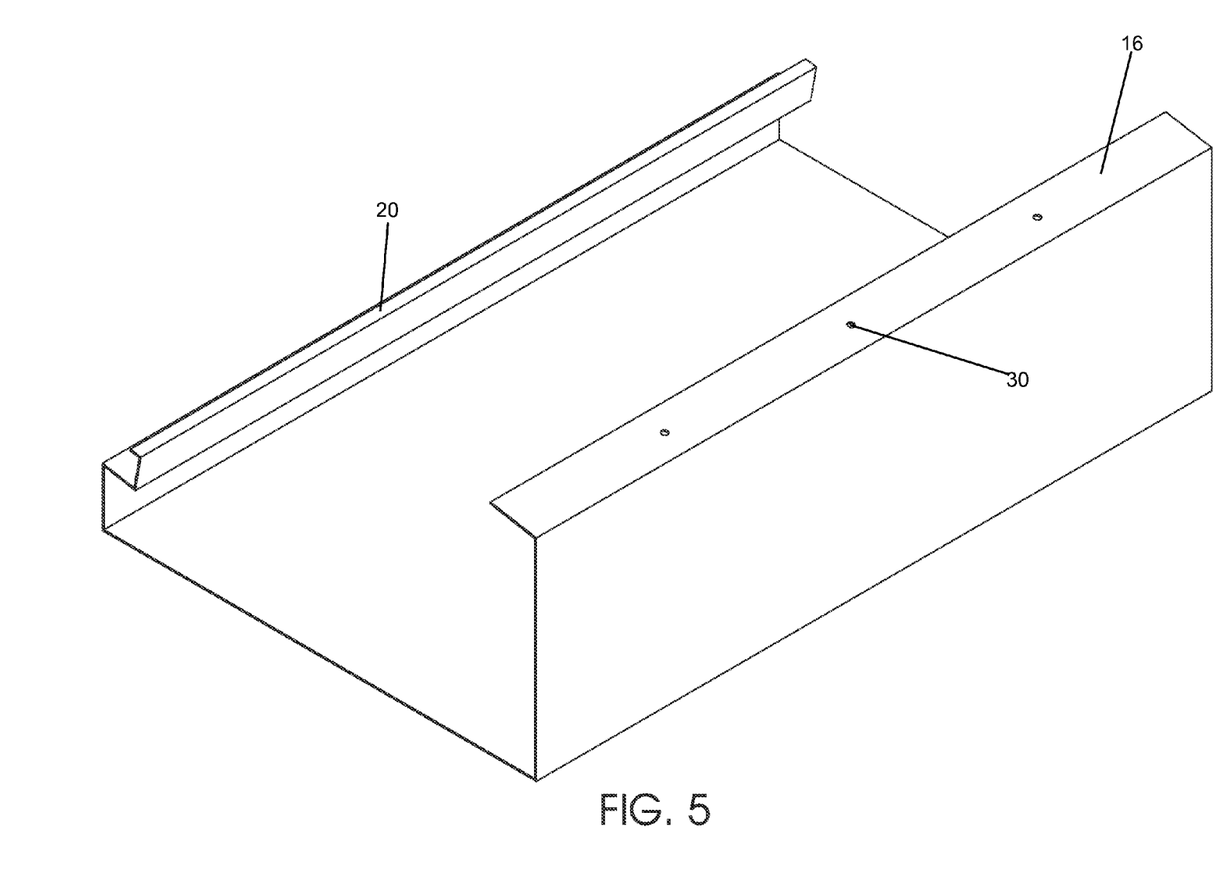
FIG. 5 is a perspective view of the present invention.
Figures 6, 7:
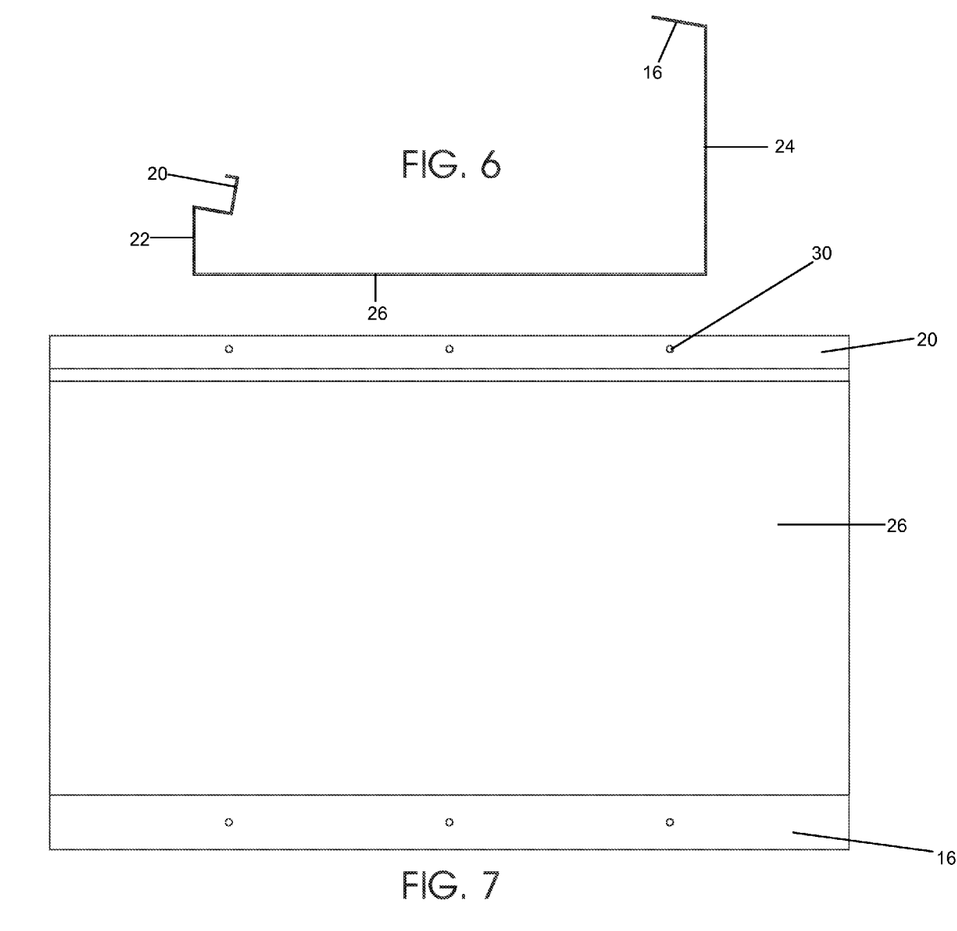
FIG. 6 is a side view of the embodiment of FIG. 5.
FIG. 7 is a top view of the embodiment of FIG. 5.
Figure 8:
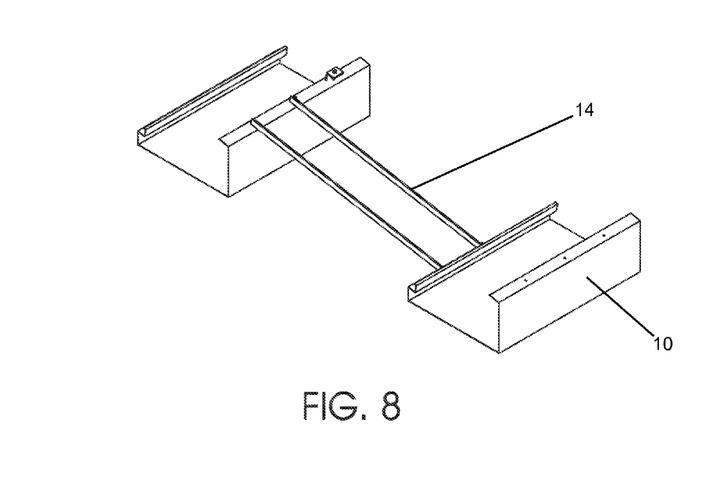
FIG. 8 is a perspective view of the present invention joined together by row spacers.
Figure 9:
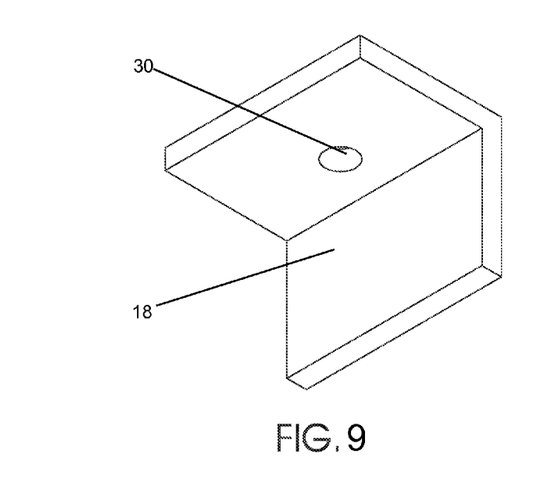
FIG. 9 is a perspective view of the clamp of the present invention.

In certain embodiments, the present invention may include two separate support structures 10, as shown in 4C and 4B. In such embodiments, the first support structure 10 may include a first base 26 and a first side 22. The first side 22 may include a top end and a bottom end. The bottom end may be connected to the first base 26 and the top end may form the channel 20. The second support structure 10 may have a second base 26 and a second side 22 with a top end and a bottom end. The bottom end may be connected to the second base 26 and the top end may form the support flange 16. The required distance between structures 10 is maintained by spacer(s) 14 and/or a supplemental ballast pan 28. Such embodiments may further include all of the components listed above.

The present invention may include assembling a plurality of support structures 10, row spacers 14, clamps 18 and panels 12 in a pattern, such as a grid. A first support structure 10 may be mounted on a surface and spaced apart at an appropriate distance from a second support structure 10. The row spacers 14 may be may be affixed laterally between the first and second support structures 10 providing longitudinal spacing between the support structures 10. A first edge of the panel 12 may be inserted into the channel 20 of the first support structure 10 and a second edge of the panel 12 may be fastened to the support flange 16 of the second support structure 10 that is mounted across from the first support structure 10. The clamps 18 may further secure the second edge of the panel 12 to the support flange 16. As illustrated in the Figures, three pairs of support structures 10 may support two panels 12.

If a lateral pattern is used for the assembly, lateral spacing is provided by using spacer 14 between each panel 12. The column spacer is placed or fastened along a point or points on the support structures 10 located perpendicular to the open channel 20 or support flange 16. Typically, ballast blocks may be placed in the open portions of the support structures 10 to provide resistance to wind generated forces. Alternately, secondary framing may be installed and fastened to the support structures 10 to provide resistance to wind or seismic generated forces. At each end of each row, to maintain parallel rows of support structures 10 and to prevent rotation of support structures 10 relative to panel(s) 12, at least one additional spacer 14 and/or a supplemental ballast pan 28 may be installed.

It should be understood, of course, that the foregoing relates to exemplary embodiments of the invention and that modifications may be made without departing from the spirit and scope of the invention as set forth in the following claims.

What is claimed is:

1. A device for securing a panel comprising:
   a support structure comprising a first side, a second side, and a base in between the first side and second side,
   wherein the first side and the second side each comprises a top end opposite a bottom end, wherein the first side and the second side each connect to the base at the bottom end and extend vertically relative to the base,
   wherein a channel is formed at the to end of the first side and is sized to receive an edge of the panel within, wherein the channel is formed in between a first portion formed by a first bend in a first direction away from the second side, a second portion formed by a second bend in the first direction, and a third portion formed by a third bend in a second direction, opposite that of the first direction, wherein an entrance of the channel is substantially facing away from the second side,
   wherein a support flange is formed at the top end of the second side.

2. The device of claim 1, wherein the support flange is protruding towards the first side.

3. The device of claim 2, wherein the support flange and a top of the channel comprise apertures.

4. The device of claim 3, further comprising:
   a plurality of support structures comprising at least a first support structure and a second support structure suspended on a surface spaced apart, wherein the channel of the first support structure is facing the support flange of the second structure; and
   a panel having a first edge and a second opposing edge, wherein the first edge is within the channel, and the second edge is fastened to the support flange.

5. The device of claim 4, further comprising a row spacer comprising a first end and a second end, wherein the first end is mounted to the channel of the first support structure and the second end is mounted to the support flange of the second support structure.

6. The device of claim 4, further comprising a clamp securing the second edge to the support flange.

7. The device of claim 4, further comprising a supplemental ballast pan oriented in between the first support structure and the second support structure.

8. The device of claim 5, wherein the panel is a solar module.

9. The device of claim 1, wherein the support flange is formed into a second channel facing away from the first side.

* * * * *